United States Patent
Englert et al.

(10) Patent No.: US 8,355,120 B2
(45) Date of Patent: Jan. 15, 2013

(54) DOPPLER ASYMMETRIC SPATIAL HETERODYNE SPECTROSCOPY LIGHT DETECTION AND RANGING RECEIVER

(75) Inventors: Christoph R. Englert, Springfield, VA (US); David E. Siskind, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 317 days.

(21) Appl. No.: 12/876,755

(22) Filed: Sep. 7, 2010

(65) Prior Publication Data

US 2011/0222048 A1 Sep. 15, 2011

Related U.S. Application Data

(60) Provisional application No. 61/312,449, filed on Mar. 10, 2010.

(51) Int. Cl.
*G01P 3/36* (2006.01)
(52) U.S. Cl. ..................................... 356/28.5
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | |
|---|---|---|---|
| 4,195,931 A | 4/1980 | Hara | |
| 5,088,815 A | 2/1992 | Garnier et al. | |
| 5,214,484 A | 5/1993 | de Mollerat du Jeu | |
| 6,181,412 B1* | 1/2001 | Popescu et al. | 356/4.09 |
| 7,773,229 B2 | 8/2010 | Harlander et al. | |
| 2007/0046945 A1* | 3/2007 | Schwiesow | 356/451 |
| 2007/0171397 A1* | 7/2007 | Halldorsson et al. | 356/28.5 |
| 2008/0180691 A1 | 7/2008 | Hays et al. | |
| 2010/0026981 A1 | 2/2010 | Spinelli et al. | |

OTHER PUBLICATIONS

Babcock, D.D. et al., A space Flight Prototype DASH Instrument for Measuring Upper Atmospheric Winds, Jul. 18-25, 2010,pp. 1-17,COSPAR 38th Scientific Assembly, Bremen, Germany.
Driggers, Ronald G., Encyclopedia of Optical Engineering, 2003, pp. 1114-1127, vol. 2, Marcel Dekker, New York, USA.
Endemann, Martin, ADM-AEOLUS ESA's Wind Mission, Sep. 26-28, 2006, pp. 1-19, Europea Space Agency, Noordwijk, NL.
Englert, Christoph R. et al., (DASH): concept and experimental demonstration, Applied Optics, Oct. 10, 2007,pp. 7297-7307, vol. 46, No. 29, Optical Society of America, USA.

(Continued)

*Primary Examiner* — Luke Ratcliffe
(74) *Attorney, Agent, or Firm* — Amy L. Ressing; John L. Young

(57) ABSTRACT

Obtaining global tropospheric vertical wind profiles by directly detecting atmospheric winds using space borne, airborne and/or ground station platforms is accomplished by a DASH interferometer in the back-end of a Doppler wind LIDAR. In the front-end of the Doppler wind LIDAR, a laser illuminates an atmosphere and a telescope collects backscattered laser light return signals from the laser illuminated atmosphere. The DASH interferometer processes return signals from the atmosphere, forming an interferogram and determines from the interferogram a Doppler shift of the return signals, which is equivalent to determining the line of sight wind speed of the Doppler wind LIDAR observation, by measuring the frequency shift caused by winds. From this determination, global and/or non-global atmospheric wind profile data are transmitted over a communications network in either real-time and/or non-real-time, to facilitate weather forecasting, weather modeling, weather avoidance navigation, atmospheric research, hurricane warnings, operations systems selections and deployment of operational assets.

20 Claims, 12 Drawing Sheets

OTHER PUBLICATIONS

Gentry, Bruce M. et al., Wind measurements with 355-nm molecular Doppler lidar, Optics Letters, Sep. 1, 2000, pp. 1231-1233, vol. 25, No. 17, USA.

Grund et al., OWAL System Development Status, Working Group on Space-based Lidar Winds 2009, pp. 1-30, Wintergreen, VA, USA.

Harlander et al.,Design&LabTests of DASH Interferometer forUpper Atmospheric Red Line(630nm) Wind&TempObservations,Jul. 18, 2010,pp. 1-19,COSPAR38thScientificAsmbly,Bremen, Germany.

Hays et al.,Space-based Doppler Winds LIDAR: A Vital National Need, National Research Council Decadal Study RFI, May 2005, pp. 1-15, USA.

Morancais et al., ALADIN: The First European LIDAR in Space, Materials Research Society Symposium Proceedings, 2005, pp. 1-12, vol. 883, Toulouse Cedex, France.

Paffrath, Ulrike, Performance assessment of the Aeolus Doppler wind lidar prototype, Dissertation, May 17, 2006, pp. 1-143, Technical University of Munchen, Germany.

Straume et al., ADM-AEOLUS, 2007, http://www.eumetsat.int/Home/Main/Publications/Conference_and_Workshop_Proceedings/cps/documents/pdf_c_p50_s1_12_straumel_p.pdf [Internet].

Sun et al., Accuracy Analysis of the Fabry-Perot Etalon Based Doppler Wind Lidar, Optical Review, Jul. 15, 2005, pp. 409-414, vol. 12, No. 5, Japan.

Thuillier G.et al.,Thermally stable field compensatedMichelson interferometer for measurement of . . . planetary atmospheres,Applied Optics,1991,pp. 1210-1220,vol. 30, No. 10,USA.

Thuillier G. et al., Fully compensated Michelson interferometer of fixed-path difference, Applied Optics, 1985, pp. 1599-1603, vol. 24, No. 11, USA.

Blaine R. Copenheaver, International Search Report and Written Opinion, Apr. 12, 2011, pp. 1-9, The International Searching Authority, Alexandria, VA, United States.

\* cited by examiner

DOPPLER ASYMMETRIC SPATIAL HETERODYNE SPECTROSCOPY LIGHT DETECTION AND RANGING RECEIVER

RELATED APPLICATIONS

This application is related to U.S. Provisional Patent Application 60/952,121; U.S. patent application Ser. No. 12/179,720 now issued U.S. Pat. No. 7,773,229; and U.S. Provisional Patent Application 61/312,449 herein incorporated by reference each in its entirety; and from which this application claims benefit of priority under 35 USC 119(e).

FIELD OF THE INVENTION

The present disclosure relates to civilian, as well military atmospheric research and Earth weather investigations, such as the investigation of hurricanes. More particularly, the present disclosure presents a system and method of conducting space based tropospheric wind observations that can improve global and local weather forecast models.

BACKGROUND OF THE INVENTION

Space based tropospheric Doppler wind Light Detection And Ranging systems (LIDARs) are currently emerging as the method of choice for obtaining global tropospheric vertical wind profiles from low Earth orbit satellites. The European Space Agency (ESA) is planning to launch the first space based Doppler wind Light Detection And Ranging (LIDAR) system in the near future (approximately May 2011) called the Atmospheric Dynamics Mission (ADM)-Aeolus. In the United States, there is an active community, consisting of civilian agencies such as the National Aeronautics and Space Administration (NASA) and the National Oceanic and Atmospheric Administration (NOAA); Universities (such as the University of Alabama, University of Washington, Florida State University, University of Utah); and the commercial sector (including Ball Aerospace), that is actively pursuing research with the goal of flying a tropospheric wind LIDAR in space. As early as 20 years ago, a "NASA Laser Atmospheric Wind Sounder (LAWS) Science Team" was established, which in 1994 led to the formation of the "Working Group on Space-Based Lidar Winds". This group consists of US university researchers and scientists and engineers from US civilian government agencies. It meets twice a year for a multi-day meeting to exchange the latest results and developments, concerning space borne Doppler wind LIDAR initiatives. Research and development activities, as well as missions planned by this active community, combined with the perceived importance of meteorological measurement, which was documented in publications by agencies such as NASA, NOAA, and the National Science Foundation (NSF), foster opportunities for application, sale, and/or licensing of the present invention disclosed herein. Moreover, there is a clear military application for space based, tropospheric wind observations, as such observations will improve global and local weather forecast models and provide increased battle field environment information, critical for operations planning and systems selection.

Historically, Doppler wind LIDARs have been used to measure tropospheric winds from ground based and airborne platforms. Currently, both in Europe and the US, there are efforts to use the LIDAR technique from a space based platform (low Earth orbit satellite) to obtain global tropospheric wind speeds versus altitude observations for assimilation into weather models and other atmospheric research purposes, such as the investigation of hurricanes.

Referring to FIG. 1A and FIG. 1B, the rudimentary system components of a Doppler wind LIDAR system (such as Doppler wind LIDAR 100) generally consist of a front-end 110 having a laser 112 which can be a monochromatic laser that illuminates the atmosphere 102, a telescope 114, which collects backscattered laser light return signal(s) 130 backscattered by the atmosphere 102, and a back-end 120, including a receiver 124, which measures a Doppler shift 200 from the signal of the backscattered laser light return signal(s) 130. The time difference between a laser pulse and the detection by the receiver can be used to determine the spatial difference (range) between the LIDAR instrument and where the scattering of the laser signal occurred in the atmosphere. The backscattered laser light return signal(s) 130 typically consists of two components which originate from atmospheric gas molecules 108 and atmospheric aerosols 106. Due to the large mass difference between atmospheric gas molecules 108 and atmospheric aerosols 106 that are in thermodynamic equilibrium and the resulting difference in the velocity distribution of the scatterers, the spectral width of the backscattered line is much larger for the molecular backscattering than the signal originating from the scattering of the aerosol particles. In addition to this line broadening, the bulk motion of the atmosphere 102 along the direction of the laser beam (line of sight) causes the Doppler shift 200 of the backscattered laser light return signal(s) 130, which is equivalent to the line of sight wind speed, see FIG. 1B, which illustrates a sketch of the involved spectra.

Referring again to FIG. 1B, this illustration, from Endeman [2006], shows the signal from the monochromatic laser, such as the laser 112, and the superimposed backscattered laser light return signal(s) 130, consisting of the molecular scattering (Rayleigh Signal 132) and aerosol scattering (Mie Signal 134) for a near ultra violet (UV) Doppler wind LIDAR such as the Doppler wind LIDAR 100 illustrated in FIG. 1A, contemplating the ADM Aeolus mission of the European Space Agency. Rayleigh scattering theory (named after the British physicist Lord Rayleigh) describes the elastic scattering of electromagnetic radiation by particles much smaller than the wavelength of the light, such as atmospheric gas molecules 108. Mie scattering theory (named after the German physicist Gustav Mie) describes the scattering and absorption of electromagnetic radiation by spherical particles of any size (such as idealized atmospheric aerosols 106) through solving the Maxwell equations.

The spectral widths given in FIG. 1B are expressed in corresponding velocity units. Note that the absolute intensity of the outgoing signal of the laser 112 is many times larger than the return signal (such as the Rayleigh Signal 132 of the backscattered laser light return signal(s) 130).

Again referring to FIG. 1B, the determination of the Doppler shift 200 of both the molecular and aerosol backscattering signals is performed using either a direct (incoherent) detection system or a heterodyne (coherent) detection system, depending primarily on the spectral width of the return signal and the signal wavelength (see Rocadenbosch, 2003 or Pfaffrath, 2006).

Referring again to FIG. 1B, the current state of the art techniques include coherent detection methods that are based on mixing the atmospheric signal with a local oscillator signal that is slightly offset in frequency from a LIDAR laser signal and the subsequent amplification and detection of the difference signal. This technique is typically used for the detection of the spectrally narrow aerosol backscatter signal, such as the Mie Signal 134. Incoherent techniques, i.e., the direct detection techniques, can be used for both the aerosol backscattering signals (i.e., Mie Signal 134) and the molecular backscattering signals (such as the Rayleigh Signal 132), where the molecular backscattering signals have a much broader spectral width due to the higher thermal velocity of the molecules. These techniques include edge detection with filters and fringe detection techniques. Edge detection filters are typically Fabry Perot interferometers, which have high surface tolerance requirements and are difficult to align and to keep aligned in rough thermal and mechanical environments. Fringe imaging techniques also use Fabry Perot interferometers, but Fizeau interferometers, and Stepped Fourier Transform Spectrometer or stepped FTS (which includes Optical Autocovariance Wind LIDAR (OAWL)) can also be employed.

In the heterodyne (coherent) detection system, the return signal is combined with the outgoing signal of the laser 112, and that outgoing signal is shifted by an additional amount (also called: an intermediate frequency). This allows the determination of the magnitude and sign of the Doppler shift 200 from the detected difference signal, which is the sum of the intermediate frequency and the Doppler shift 200 component. Heterodyne detection systems are generally used for narrow band return signals, such as aerosol scattering signals (i.e., Mie Signal 134).

Referring to FIG. 2, edge detection techniques incorporate a spectral filter placed at one steep edge of the returned spectral line, where a small line shift results in a large change of the signal transmitted by the filter.

Referring again to FIG. 2, improved edge detection techniques incorporate two spectral filters. A first spectral filter B 206 ($T_B(I)$) is placed on a red edge of the return line and a second spectral filter A 204 ($T_A(I)$) is placed on the blue edge of the return line, where a ratio of the filtered signals can be used to determine the Doppler shift 200.

Again referring to FIG. 2, (contrasting transmission intensity in arbitrary units (a.u.) with wavelength in picometers (pm)), typically, Fabry-Perot type interferometers are used as the spectral filters in the edge detection techniques, where the edge detection techniques are generally used for molecular scattering signals, due to the difficulty of manufacturing narrow enough filters for the much narrower aerosol signals. FIG. 2 illustrates a typical spectral filter arrangement for the two filter detection technique, such as filter A 204 ($T_A(I)$) and filter B 206 ($T_B(I)$) (also known as the double edge detection technique). Filter A 204 ($T_A(I)$) and filter B 206 ($T_B(I)$) can both be dielectric interference filters.

Referring again to FIG. 2, this illustration, taken from Pfaffrath [2006], shows the atmospheric return signal, such as the backscattered laser light return signal(s) 130 for zero wind speed and a finite wind speed as well as the transmittance functions of the two edge spectral filters A 204 ($T_A(I)$) and B 206 ($T_B(I)$). The ratio of the signals transmitted by the two edge spectral filters A 204 ($T_A(I)$) and B 206 ($T_B(I)$) contains the line position information.

Referring to FIG. 2, FIG. 4 and FIG. 5, determining the Doppler shift 200 of the aerosol signal with a direct detection system (also known as the incoherent detection system) includes fringe imaging by an array detector, such as an array detector 410, see FIG. 4 and FIG. 5. Exemplary embodiments include imaging a Fabry Perot ring pattern, which contains the line position information in the radius of the ring (transmittance angle) on an array detector, and/or imaging the straight fringe(s) formed by a Fizeau interferometer, which carry the line position information in their lateral position.

The ESA ADM Aeolus mission, incorporating the first space borne Doppler wind LIDAR, uses a Fizeau interferometer for the aerosol signal (Mie Signal 134) and a double Fabry-Perot interferometer, such as filter A 204 and/or filter B 206 (see FIG. 2) to perform edge detection on the molecular signal (Rayleigh Signal 132).

In addition to the detection systems described above, a new type of direct detection concept is currently being developed in the US by Ball Aerospace & Technologies Corp. It is called Optical Autocovariance Wind LIDAR (OAWL) and is supported by NASA. The OAWL concept is based on imaging four phases of a fringe (0, π/2, π, 3π/2) created by a Mach-Zehnder-like interferometer. This concept is, in principle, similar to a phase-stepped Michelson concept previously used for passive measurement of upper and middle atmospheric winds by the Wind Imaging Interferometer (WINDII) on NASA's Upper Atmosphere Research Satellite (UARS). However, OAWL has some distinct differences to the WINDII approach, for example OAWL has no moving optical parts; and it measures all four phase points simultaneously [Grund, 2009].

FIG. 3 illustrates a typical optical autocorrelation function (OACF) or interferogram versus the optical path difference (OPD) and the four phase points that are sampled by the OAWL technique.

Referring again to FIG. 3, the interferogram of a return signal consisting of a spectrally wide molecular contribution and a spectrally narrow aerosol contribution is illustrated by the traveling wave extending across FIG. 3. The rapidly decaying envelope function at low OPD originates from the wide line returning from the molecular scattering. The fringes for the higher OPD originate from the narrow aerosol signal. The inserts illustrate the four phase points sampled simultaneously by the OAWL approach for zero wind and the Doppler shifted atmospheric return (Figure from: Grund et al., 2009).

Referring to FIG. 4, and FIG. 6, independent of any Doppler wind LIDAR activities, the US Naval Research Laboratory (NRL) and St. Cloud State University have developed an optical technique to passively measure middle and upper atmospheric winds using the Doppler shift of naturally occurring atmospheric emission lines (herein "Doppler Shifted Emission 602") associated with atmospheric gas molecules 108 and/or atmospheric atoms 604 (see the DOPPLER WIND INSTRUMENT 600, illustrated in FIG. 6), rather than LIDAR backscattered laser light return signal(s) 130 (see FIG. 1A). The concept of this optical technique to passively measure middle and upper atmospheric winds is called DOPPLER ASYMMETRIC SPATIAL HETERODYNE SPECTROSCOPY (DASH) (herein "DASH 400") and has been proven in the laboratory and is disclosed in issued U.S. Pat. No. 7,773,229, discussing various embodiments including using a Koesters prism.

Referring to FIG. 4, a field-widened DASH 400 technique potentially provides a throughput (sensitivity) advantage over conventional techniques in addition to the robustness, compactness, and the fact that it does not need moving optical parts. A major difference of DASH 400, when compared to the other fringe imaging techniques, is that it can simultaneously detect many hundred phase samples and a number of fringes; according to exemplary embodiments, typically 512 phase samples and 40-200 fringes.

Referring again to FIG. 4, DASH 400 can be built in a compact, robust way, which makes it suitable for space flight, because the DASH 400 concept does not require any moving optical parts and thus does not require routine realignment of optical components. Furthermore, DASH 400 exhibits large Etendue (Sensitivity): As exhibited by the phase-stepped Michelson interferometer (also termed Stepped Fourier Transform Spectrometer or stepped FTS), DASH 400 can be field widened to enhance interferometric throughput.

Again referring to FIG. 4, in addition DASH 400 exhibits increased immunity to ghosts and background features: Since DASH 400 records several hundred interferogram points within an optical path difference interval centered on a path offset, DASH 400 implementations provide increased immunity to interferometer ghost fringes, effects of laser mode hopping and background signal features which are more difficult to identify if only four or eight phase points are available.

Referring again to FIG. 4, thermal drifts: Just as for stepped FTS, Fizeau and Fabry Perot interferometers, thermal effects on the measured phase are expected to be significant. To mitigate these thermal effects the interferometer can be designed using materials that provide maximum thermal compensation, as has been successfully demonstrated for stepped FTS (Thuillier and Shepherd, 1985; Thuillier and Herse, 1991). Additionally, DASH 400 allows for simultaneous phase tracking, because the large number of interferogram samples (typically 40-200) causes the simultaneous phase tracking of additional calibration lines (Englert et al., 2007). Using a two dimensional array detector, such as the array detector 410, facilitates tracking the unshifted laser line and the atmospheric signal simultaneously on different parts (rows) on the array detector 410 (see FIG. 4).

However, there are no known space based systems and/or methods of achieving tropospheric wind observations for obtaining global tropospheric vertical wind profiles, accomplished by using a Doppler Asymmetric Spatial Heterodyne Spectroscopy (DASH) interferometer as a direct detection system of a Doppler wind Light Detection and Ranging (LIDAR) receiver/instrument, in a manner equivalent to determining the line of sight wind speed with the LIDAR observation by measuring the frequency shift caused by winds, i.e., the Doppler shift of a return signal from a Doppler wind LIDAR.

Therefore, the need exists for systems and methods of obtaining global tropospheric vertical wind profiles, accomplished by using a Doppler Asymmetric Spatial Heterodyne Spectroscopy interferometer as a direct detection apparatus of a Doppler wind Light Detection and Ranging (LIDAR) receiver/instrument.

Furthermore, the need exists for space based systems and/or methods of achieving tropospheric wind observations for obtaining high precision global tropospheric vertical wind profiles, using a robust suite of stationary optical components.

SUMMARY OF THE INVENTION

Exemplary embodiments include methods and systems of obtaining, via either space borne, airborne and/or ground stationed platforms, atmospheric wind profiles, using a Doppler Asymmetric Spatial Heterodyne Spectroscopy (DASH) interferometer as a direct detection system of a Doppler wind Light Detection and Ranging (LIDAR) instrument. The LIDAR instrument includes a front-end and a back-end. The front-end includes a laser cooperatively coupled to the LIDAR instrument causing a laser signal to be emitted into an atmosphere. In addition, the front-end includes a telescope, which is cooperatively coupled to the LIDAR instrument and collects backscattered light return signal(s). The back-end of the LIDAR instrument includes the DASH interferometer, a readout electronics module and an instrument control and data management module, having a computer processor unit executing computer readable and computer executable program code, that when executed by the processor performs the operations comprising: illuminating the atmosphere using a laser signal directed towards the atmosphere; collecting, by the telescope, a backscattered light return signal from the atmosphere illuminated by the laser; feeding the backscattered light return signal directly into the DASH interferometer, through entrance optics, after and/or during and/or upon reflections of the backscattered light return signal on the primary mirror and secondary mirror of the telescope; superimposing, by the DASH interferometer, a plurality of interference fringes of wavenumber dependent spatial frequencies onto the backscattered light return signal; imaging, on an array detector by exit optics, the backscattered light return signal including the plurality of interference fringes of wavenumber dependent spatial frequencies superimposed onto the backscattered light return signal; recording, by the array detector, the plurality of interference fringes of wavenumber dependent spatial frequencies imaged on the array detector and outputting a corresponding interference image pattern by the readout electronics; determining, by the computer processor executing the computer executable program code, a Doppler shift of the backscattered light return signal, by measuring, a plurality of phase points of a heterodyned interferogram over a large path difference interval simultaneously, using a plurality of stationary optical components wherein the large path difference interval includes a path difference interval of typically several centimeters; and transmitting electronically and either providing and/or displaying, over a communications network, a plurality of realtime and/or non-realtime, global and/or non-global atmospheric wind profiles and atmospheric wind data obtained from determining the Doppler shift of the backscattered light return signal to any of a plurality of users and a plurality of user devices to facilitate weather forecasting, weather modeling, weather avoidance navigation, atmospheric research, hurricane warnings and operations systems selections and deployment of operational assets.

DETAILED DESCRIPTION OF THE INVENTION

Definitions

Figure 1A:
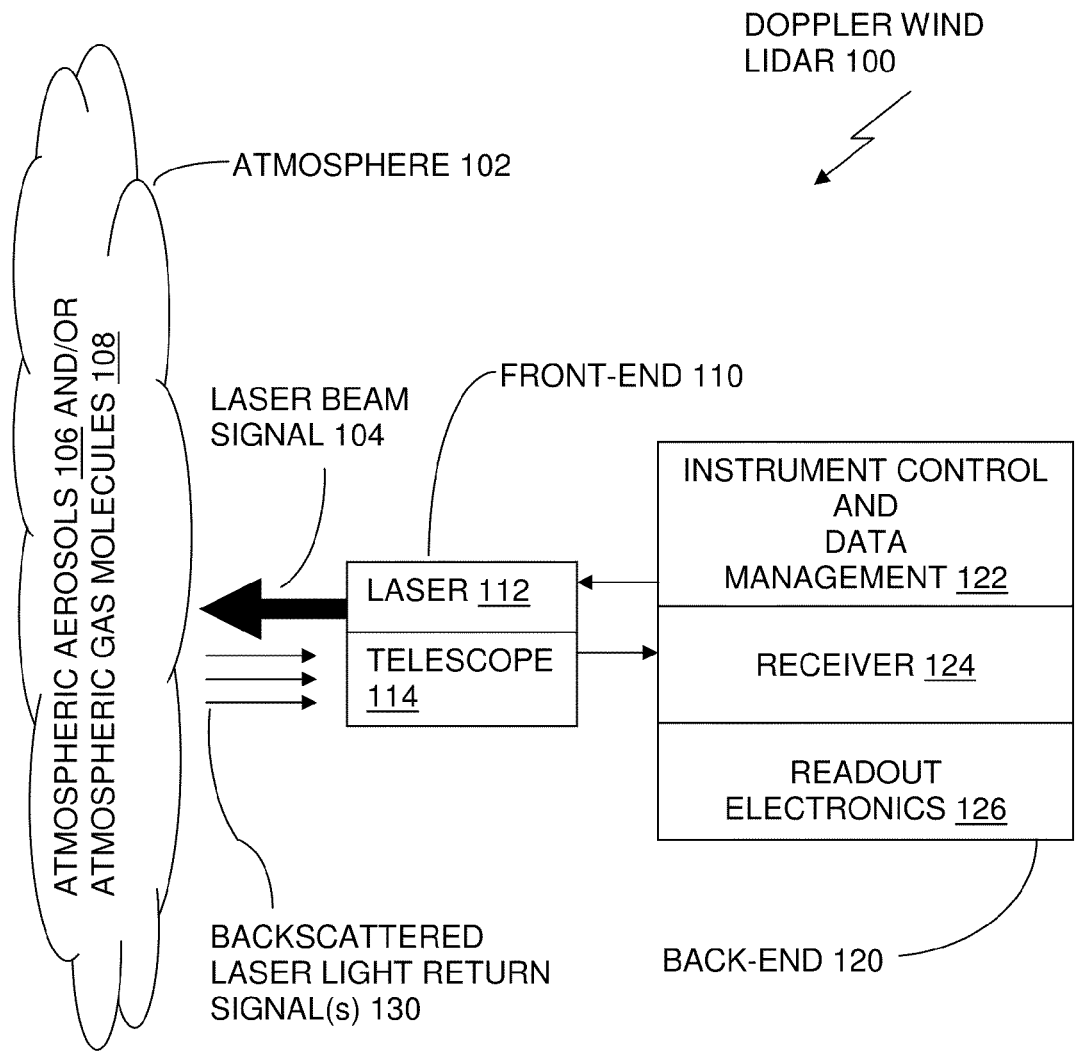
FIG. 1A illustrates system building blocks of a Doppler wind LIDAR.
Figure 1B:
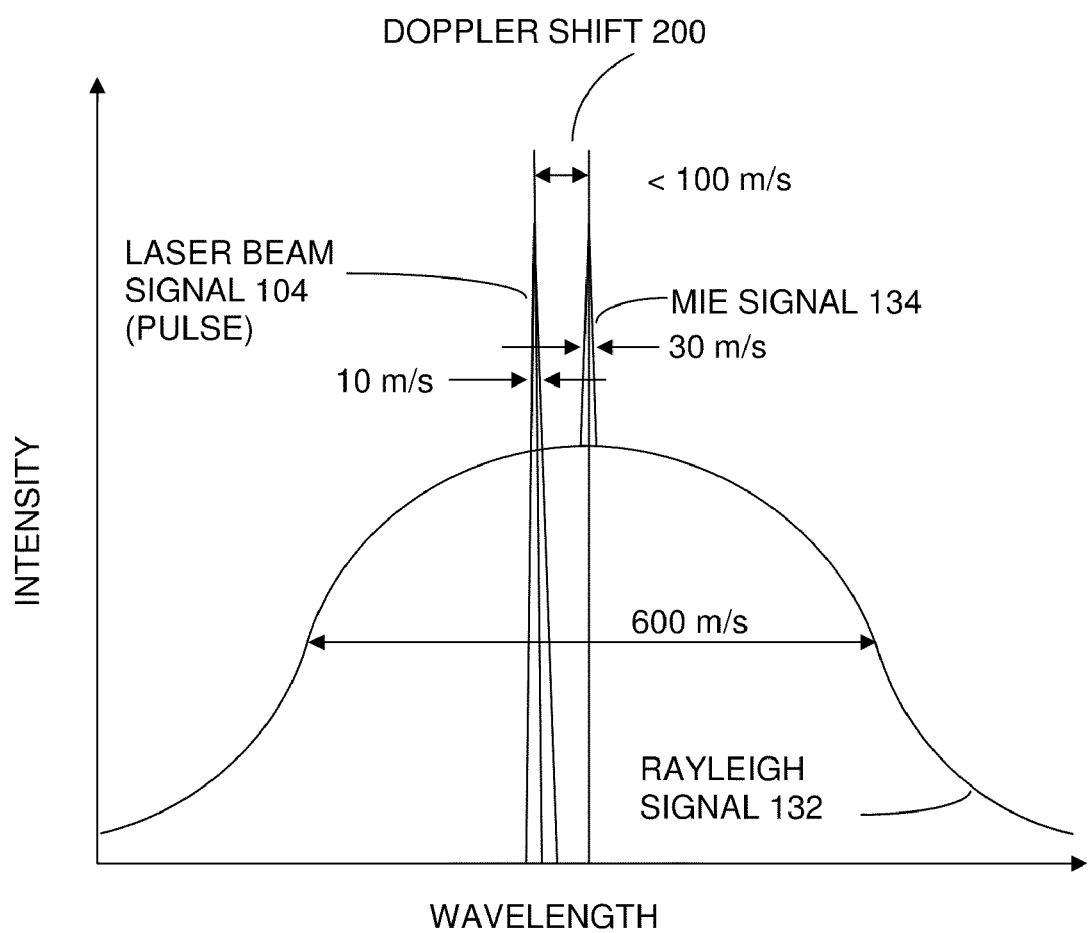
FIG. 1B illustrates a schematic of the involved spectra and shows the monochromatic laser signal 104 (pulse), and the superimposed return signals from the molecular scattering (Rayleigh Signal 132) and aerosol scattering (Mie Signal 134) for the near UV Doppler wind LIDAR on the ADM Aeolus mission of the European Space Agency.
Figure 2:
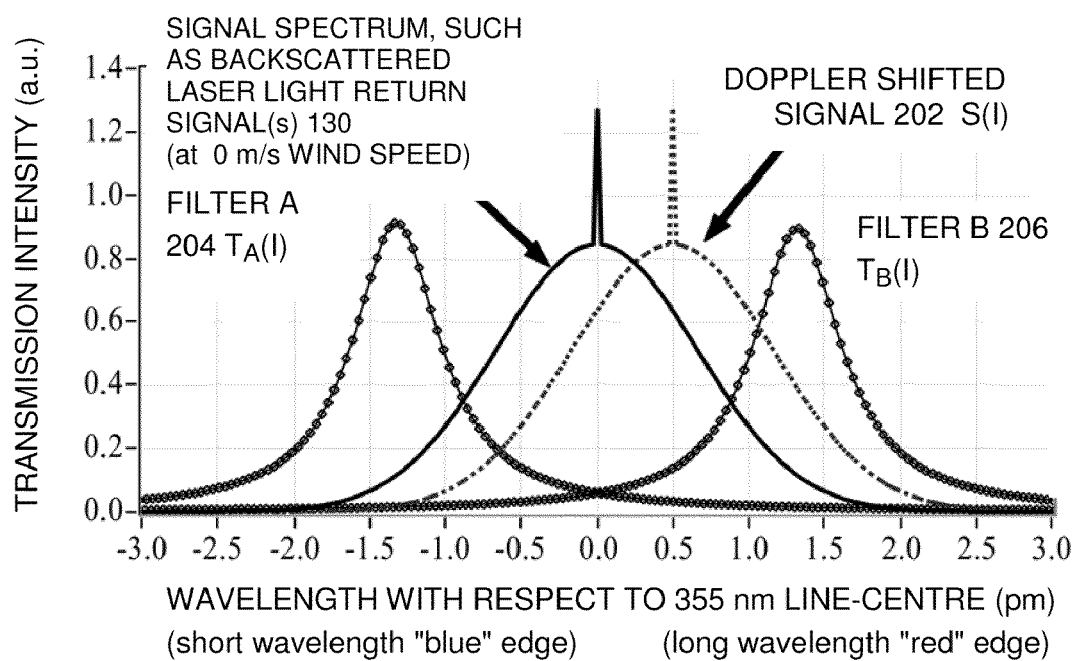
FIG. 2 illustrates the atmospheric return signal for zero wind speed and a finite wind speed as well as the transmittance functions of the two edge filters A and B. The ratio of the signals transmitted by filters A and B contains the line position information.
Figure 3:
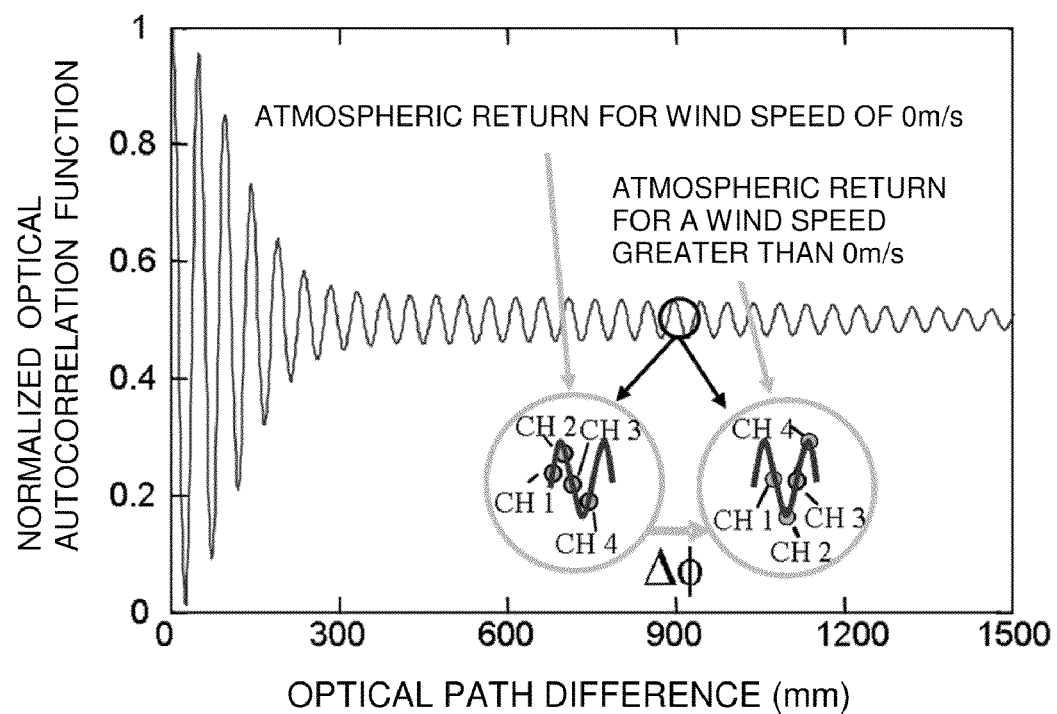
FIG. 3 illustrates an interferogram of a return signal consisting of a spectrally wide molecular contribution and a spectrally narrow aerosol contribution.

BS: Beamsplitter;

$L_i$: Lenses schematically representing the telescope and exit optics;

$P_i$: Field widening prisms; and

Theta (θ): Grating angle

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced items(s).

Figure 4:
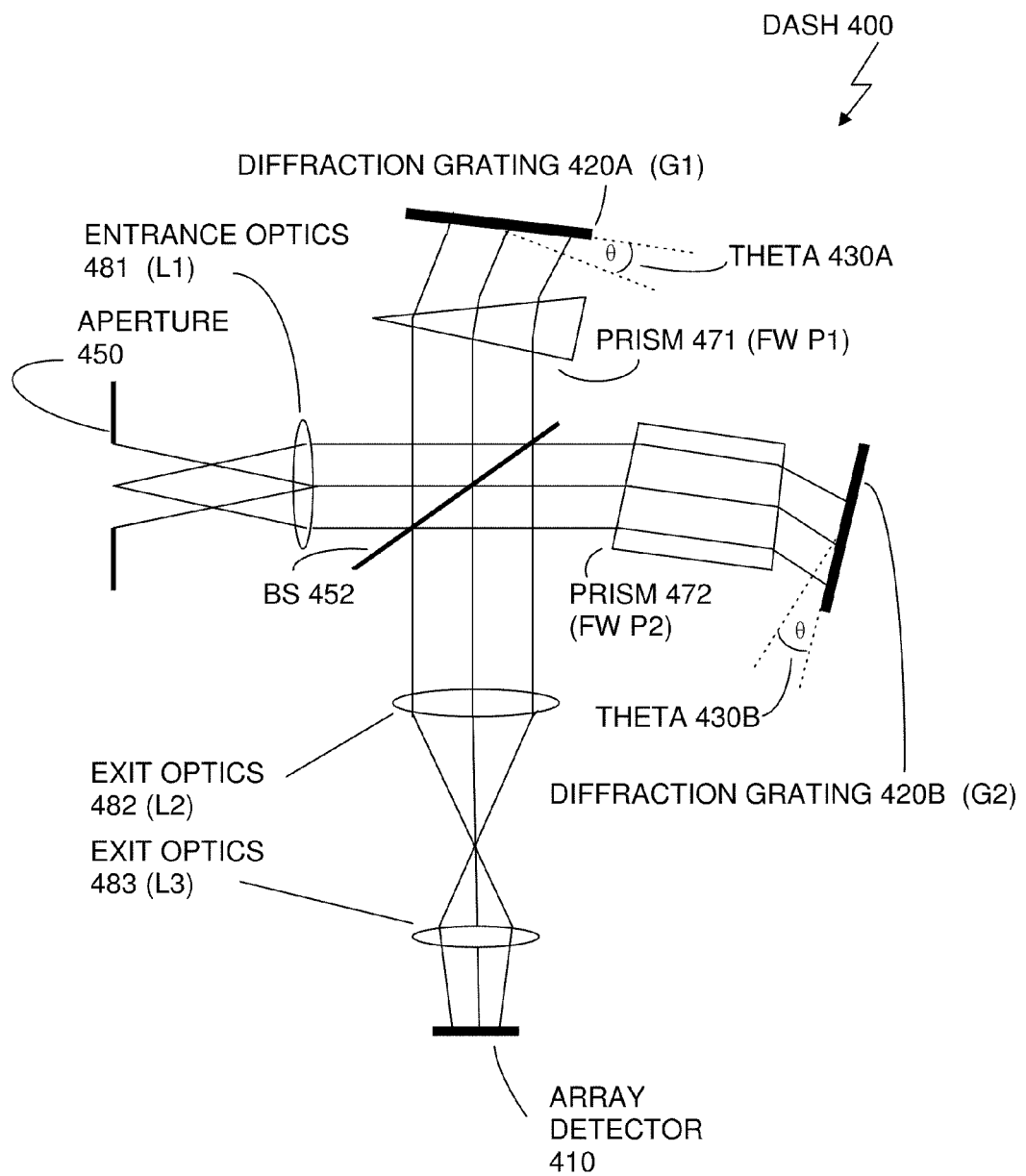
FIG. 4 illustrates a field-widened DASH configuration.
Figure 7:
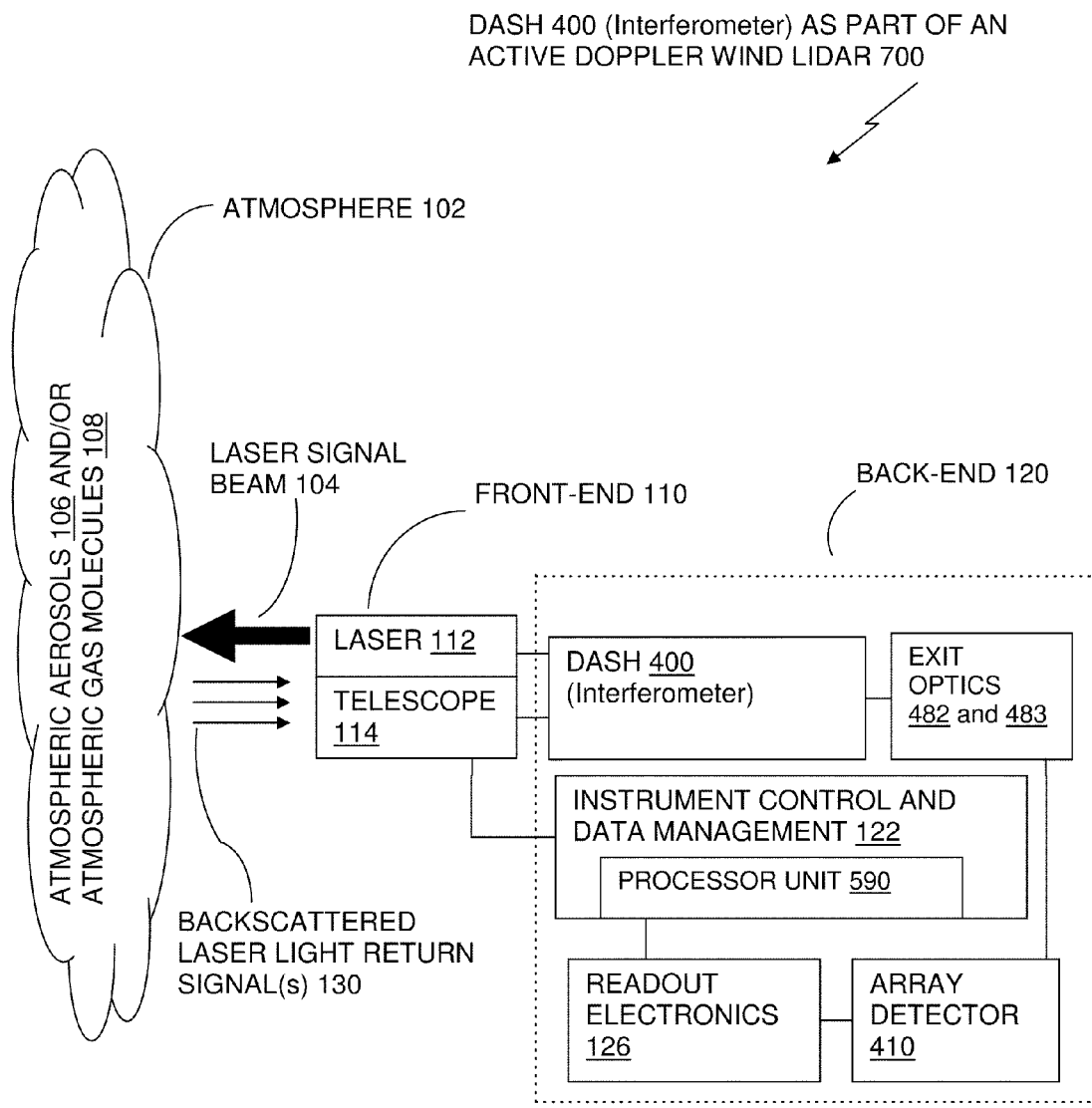
FIG. 7 illustrates a DASH interferometer as part of an active LIDAR system.

Referring to FIG. 4 and FIG. 7, exemplary embodiments disclose a Doppler Asymmetric Spatial Heterodyne Spectroscopy (DASH 400) interferometer as a direct detection system configured in the back-end of a Doppler wind LIDAR 700.

Referring to FIG. 4, Doppler Asymmetric Spatial Heterodyne Spectroscopy (DASH 400) is an approach that is a combination of the phase-stepped Michelson technique and Spatial Heterodyne Spectroscopy (SHS) subject to the invention disclosure published in issued U.S. Pat. No. 7,773,229. For completeness, some of the features and embodiments of DASH 400 are outlined below.

Referring again to FIG. 4, in DASH 400 techniques an interferogram is sampled only at large optical path differences, as in the phase-stepped Michelson technique, but the interferometer arms are terminated with fixed, tilted gratings, as in SHS. This design allows measurements of not just four but of hundreds of phase points of a heterodyned interferogram over a large path difference interval simultaneously, while utilizing optical components which are stationary and thus requiring little if any adjustments and/or alignments. Typical parameters include 512 phase points and 3 cm of path difference interval.

DASH 400 is a slight variation of the already proven basic SHS, taking advantage of the robustness, small size, and sensitivity of the SHS and extending its capability to a resolving power high enough to measure a Doppler shift caused by winds.

The primary difference between the basic SHS and DASH 400 is that in the DASH 400, the range of sampled path differences is offset from zero path difference. In the basic SHS the centers of both gratings are the same distance from the beamsplitter 452 producing a two-sided, heterodyned interferogram with zero path difference at the center, and maximum path difference at the edges of the recorded image.

In the DASH 400 apparatus concept (shown schematically in FIG. 4), one of the diffraction gratings (i.e., second diffraction grating 420B (G2)) is placed further away from the beamsplitter 452 than the other grating (i.e., first diffraction grating 420A (G1)), which makes the interferometer "asymmetric"; the interference samples may not include the point of 200 path difference. The fringe pattern measured by DASH 400 is a heterodyned interferogram obtained over a path difference interval (determined, among other parameters, by the grating angle theta 430 (θ)) [A and/or B] centered on a path difference offset or step (determined by the offset of one grating).

For the measurement of Doppler shifts, the interferometer's offset should be optimized considering the backscatter line width and other aspects like interferometer size and weight [Englert et al., 2007]. As in the basic SHS, the DASH 400 concept allows field widening without utilization of moving optical parts by choosing prisms of the appropriate wedge angle and thickness for each arm.

FIG. 4 illustrates the DASH 400 in a field-widened configuration. This field widened, asymmetric Spatial Heterodyne Spectroscopy (SHS) concept consists of a Michelson interferometer with the return mirrors replaced by a plurality of gratings, preferably two diffraction gratings 420. A first diffraction grating 420A is in a first position; and a second diffraction grating 420B is in a second position. The first diffraction grating 420A in the first position can be characterized as G1 and the second diffraction grating 420B in the second position can be characterized as G2. Backscattered signals from the atmosphere 102 enter through the aperture 450. The first and second diffraction gratings 420A and 420B, respectively are imaged onto the array detector 410 (such as a Charge-Coupled Device (CCD)) which records fringes of wavenumber-dependent spatial frequencies. The second diffraction grating 420B (i.e., grating G2 is further from the beamsplitter 452 (also described herein as "BS 452") resulting in a step in the path difference; this step can also be characterized as an offset in path difference. A path difference interval is determined by, among other parameters, the grating angle theta 430A and 430B, in proximity of prism 471 and prism 472, respectively, which are two prisms of a plurality of field widening prisms, preferably at least two field widening prisms P1 and P2 also herein referred to as prism 471 (P1) and prism 472 (P2) respectively are chosen so the geometrical images of the first and second diffraction gratings 420A and 420B, respectively are coincident (also see FIG. 5).

Referring to FIG. 7, exemplary embodiments describe an apparatus and/or system, where a Doppler wind LIDAR 700 (also described herein as "DWL 700") is illustrated using a DASH interferometer, such as DASH 400 for the direct (incoherent) detection of the Doppler shift 200 in backscattering signals, such as the backscattered laser light return signal(s) 130 from the atmosphere 102. The front-end 110 of the DWL 700 directs the laser beam signal 104 toward the atmosphere 102 and the front-end 110 collects the backscattered laser light return signal(s) 130. The collected backscattered laser light return signal(s) 130 are subsequently fed and/or collected into the DASH 400 using the entrance optics 481 (L1). The field-widened DASH interferometer (DASH 400) superimposes interference fringes onto the return signal, such as the backscattered laser light return signal(s) 130, where the superimposed interference fringes are imaged onto the array detector 410 by the exit optics 482 (L2) and exit optics 483 (L3) (also see FIG. 4 and FIG. 5, which also illustrate detector and exit optics configurations).

Referring again to FIG. 7, control of the laser 112, control of the array detector 410, and control of the readout electronics 126, along with instrument control and data management 122 are provided by a dedicated processor unit including, in exemplary embodiments, a personal computer (PC) based processor (hereafter "the processor unit 590"). The processor unit 590 also manages and displays, via an output device, data using the readout electronics 126. A plurality of computer executable instructions executed by the processor unit 590, are hosted and designated as laser 112 control, array detector 410 control, readout electronics 126 control, along with instrument control and data management 122 control.

Figure 10:
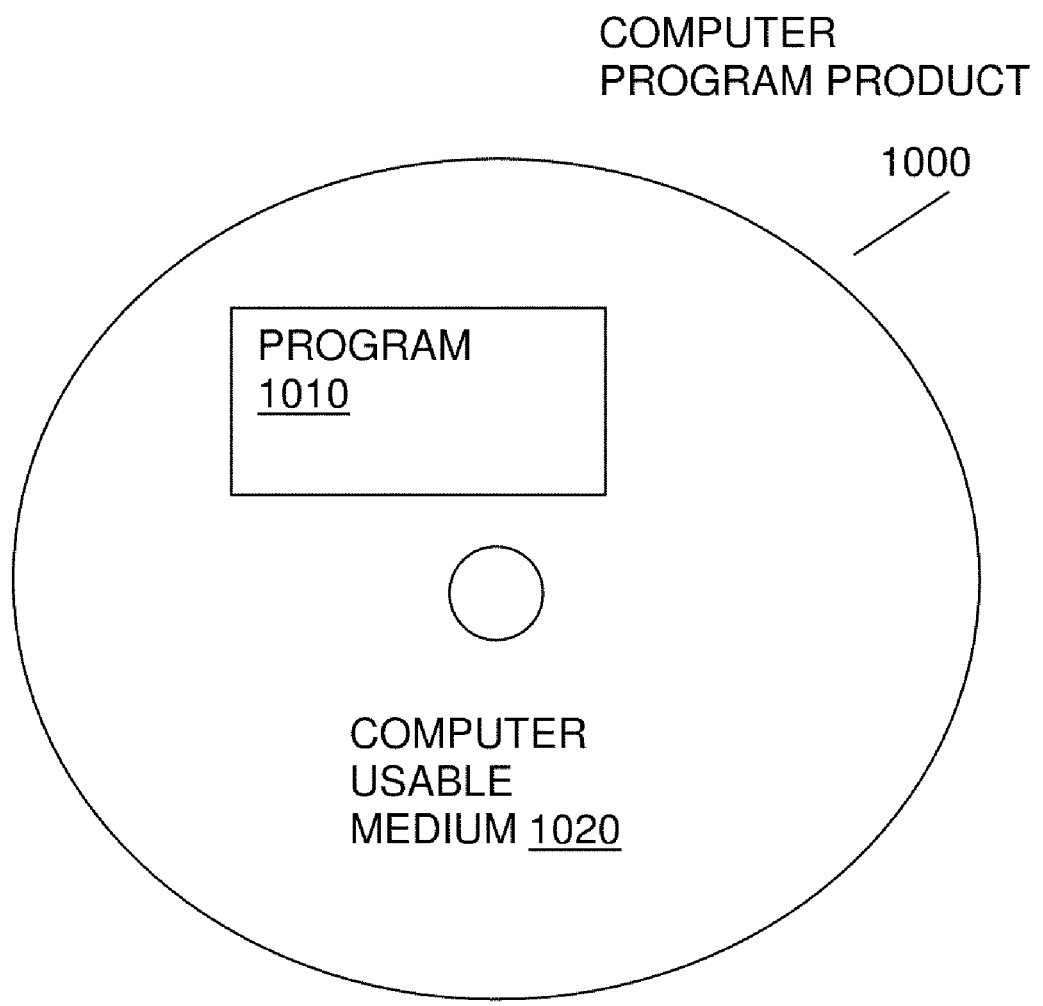
FIG. 10 illustrates an exemplary computer program product 1000 (computer usable medium 1020) containing program logic (code) program 1010 code for the method of operation of a Doppler Asymmetric Spatial Heterodyne Spectroscopy Light Detection and Ranging instrument.

Referring to FIG. 7 and FIG. 10, the processor unit 590 includes a memory unit, software and firmware and a computer processor, which can execute hosted computer programs (such as program 1010 code), as code implemented retrieved and/or called, executed and used to store and access real-time operating system(s), and atmospheric wind data.

Referring again to FIG. 7 and FIG. 10, in exemplary embodiments, the processor unit 590 includes any one or more and/or combination of a specially designed or general purpose processor, and/or a first, second and/or third processors from a plurality of processors. Any of the above mentioned processors can be an off-the-shelf processor or a custom made processor or a processor manufactured for a specific purpose, such as included in an Application Specific Integrated Circuit. Residing in the processor unit 590, is program 1010 code stored on computer readable media, such as a computer usable medium 1020 illustrated in FIG. 10 and/or the program code can be stored in any other memory device.

In exemplary embodiments, memory includes any one of or a combination of volatile memory elements, including random access memory and non-volatile memory elements including read only memory. The memory can have an architecture where various components are situated remotely from one another, but can be accessed by the processor unit 590 over communications networks.

Exemplary embodiments optionally are represented in the form of computer implemented processes, apparatuses and computer readable media for practicing the operations, sub operations and processes of a method 800 of obtaining tropospheric vertical wind profiles and other wind profiles. Referring to FIG. 8 and FIG. 10, the method operation logic and/or instructions are implemented in computer program 1010 code executed by one or more network elements and/or processing devices, such as the processor unit 590. Referring to FIG. 10, a computer program product 1000 embodied on a computer usable medium 1020 with computer program 1010 code logic containing the inventive operations instructions embodied in tangible media such as the computer usable medium 1020 as an article of manufacture. Articles of manufacture for the computer usable medium 1020 optionally can include any computer readable and computer executable storage medium. When the program 1010 code logic is loaded into and executed by a computer and/or computer processor (such as residing in the processor unit 590), the processor unit 590 becomes an apparatus combined with the DASH 400 embodied in such as the Doppler wind LIDAR 700 system for practicing the preferred embodiments. Embodiments include the program 1010 code, whether stored in a storage medium, loaded into and/or executed by a computer, or transmitted over some transmission medium, or over a communications network, such as the Internet or over electrical wiring or cabling, through fiber optics, or via electromagnetic radiation waves. When implemented on a general purpose computer or a specially designed computer, the program 1010 code segments can configure the processor unit 590 to create specific logic circuits.

Figure 5:
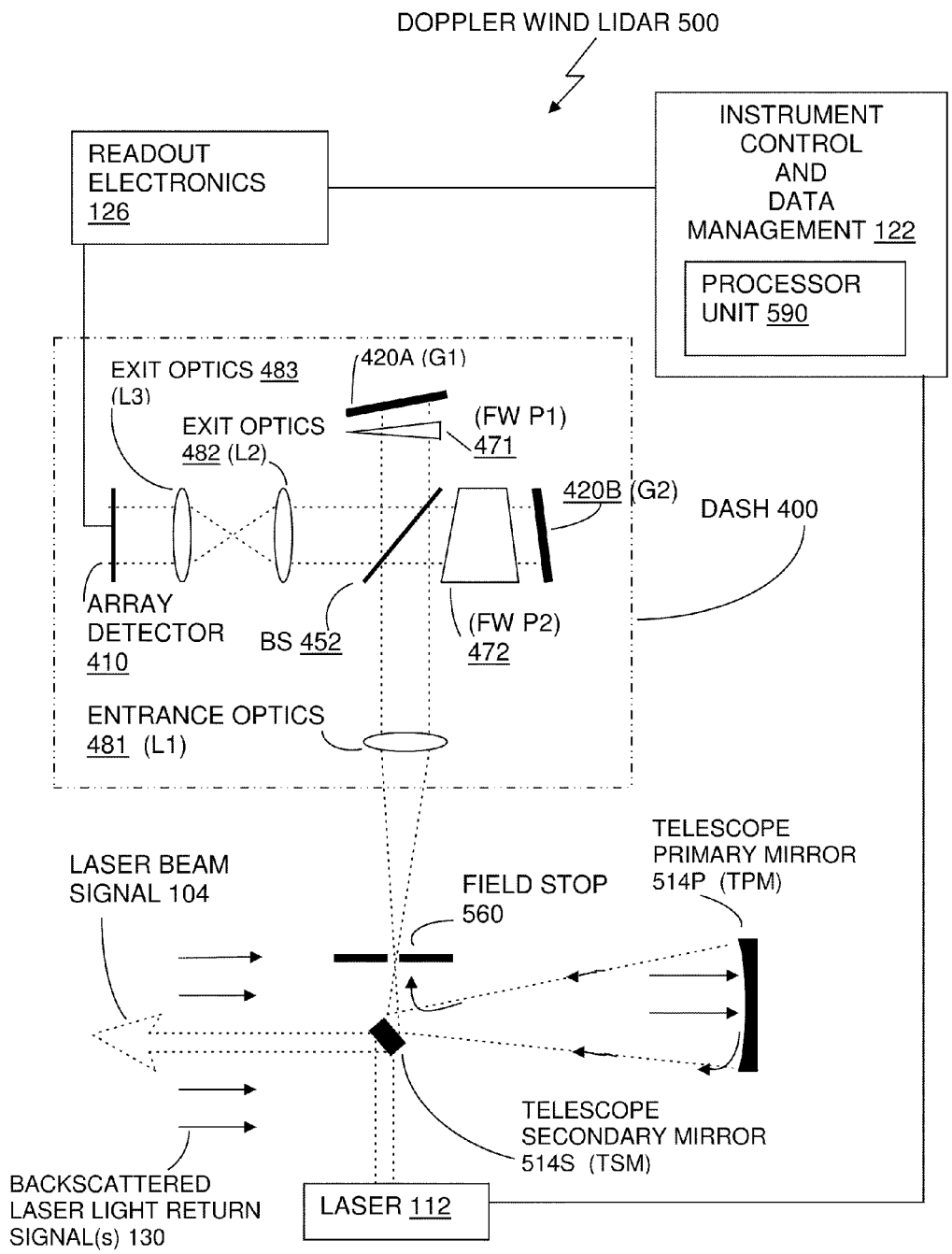
FIG. 5 illustrates a Doppler wind LIDAR using a DASH interferometer for the direct (incoherent) detection of the Doppler shift in the backscattering signal from the atmosphere.
Figure 6:
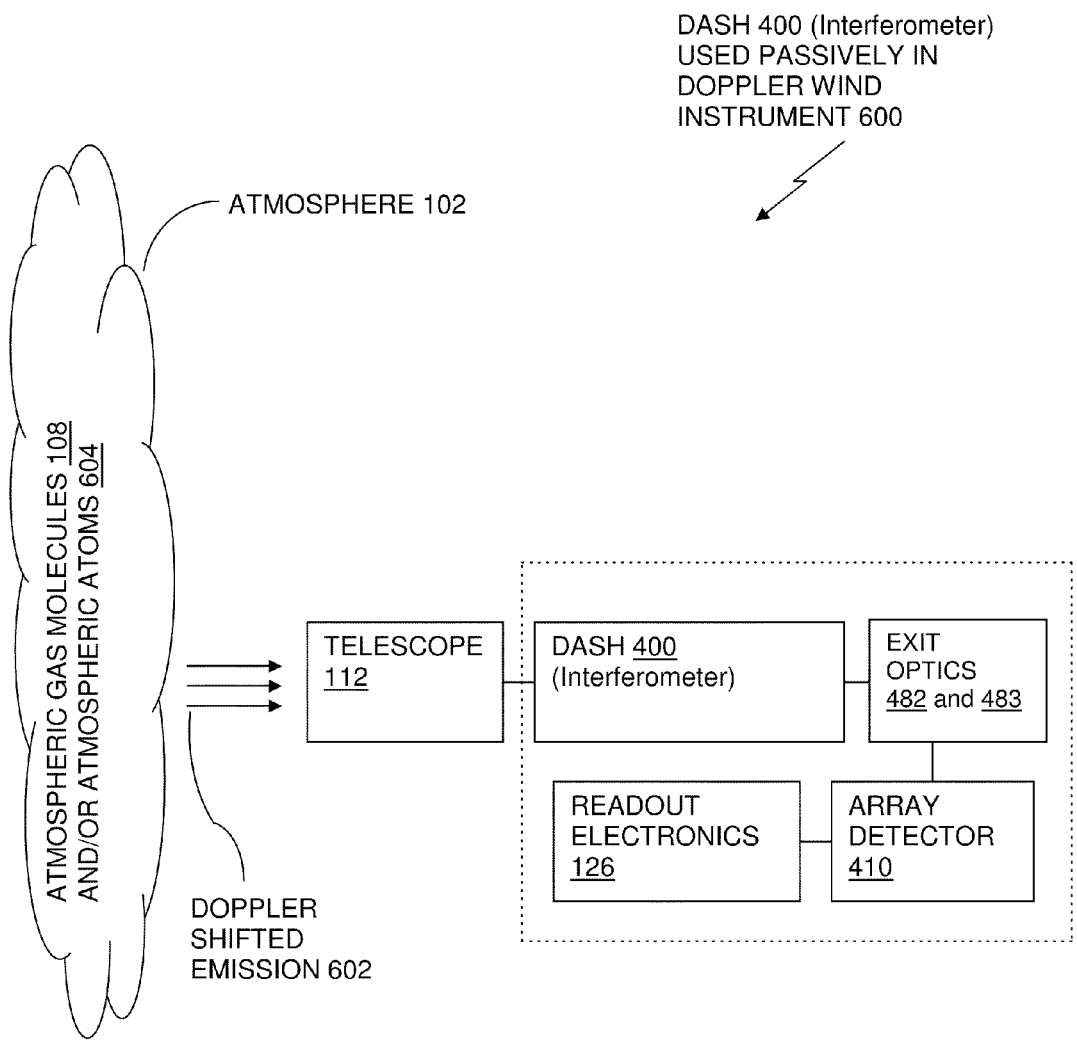
FIG. 6 illustrates a DASH interferometer used passively.

Referring to FIG. 5 and FIG. 7, the processor unit 590 optionally can contain and can be in cooperative communication with a memory controller and an input/output (I/O) controller. The I/O controller is cooperatively coupled to a plurality of peripheral devices, such as, output devices and input devices, where the input devices can be any one or more devices such as a keyboard, microphone, heat sensor, light detector, optical reader, a touch screen device, a pressure detector, temperature sensor, or vibration transducer, or a camera or a telescope and where the output device is any one or more devices such as video display, a computer terminal, speaker, a light array, a mechanical, or pressure or electrical or hydraulic transducer, or printer or readout and/or display instrument.

Referring again to FIG. 5 and FIG. 7, the laser 112 illuminates the atmosphere 102; and the signal associated with the backscattered laser light return signal(s) 130 (i.e., the light backscattered from the atmosphere 102) enters and/or is collected by the telescope 114. After being reflected by the primary mirror 514P (TPM) (see FIG. 5) of the telescope 114 and the secondary mirror 514S (TSM) of the telescope 114, the backscattered light return signal(s) 130 pass through a field stop 560 (FS) before passing through entrance optics 481(L1) upon entering and/or being fed into the DASH interferometer (DASH 400). The DASH interferometer (DASH 400) consists of the beamsplitter 452 (BS), and two interferometer arms with field-widening prisms (FP) herein referred to as field-widening prism 471 (FP1) and field-widening prism 472 (FP2) and fixed, tilted diffraction gratings (G): such as 420A (G1) and 420B (G2). The backscattered light return signal(s) 130 exiting the interferometer (DASH 400) pass through the exit optics 482 (L2) and exit optics 483 (L3) (ExO), which images a fringe localization plane onto the array detector 410.

Referring to FIG. 7, exemplary embodiments describe a method of obtaining atmospheric wind profiles, using a DASH interferometer (such as the Doppler wind LIDAR 700) as a direct detection system of a Doppler wind LIDAR instrument and/or receiver.

Referring again to FIG. 7, the Doppler wind LIDAR 700 instrument includes a front-end 110 and a back-end 120. The front-end 110 includes a laser 112 and a telescope 114. The laser 112 is cooperatively coupled to the Doppler wind LIDAR 700 instrument, and causes a laser signal to be emitted into the atmosphere 102. The telescope 114 is cooperatively coupled to the Doppler wind LIDAR 700 through the field stop 560 (see FIG. 5). The telescope 114 collects the backscattered light return signal(s) 130, backscattered from the atmosphere 102.

Figure 8A:
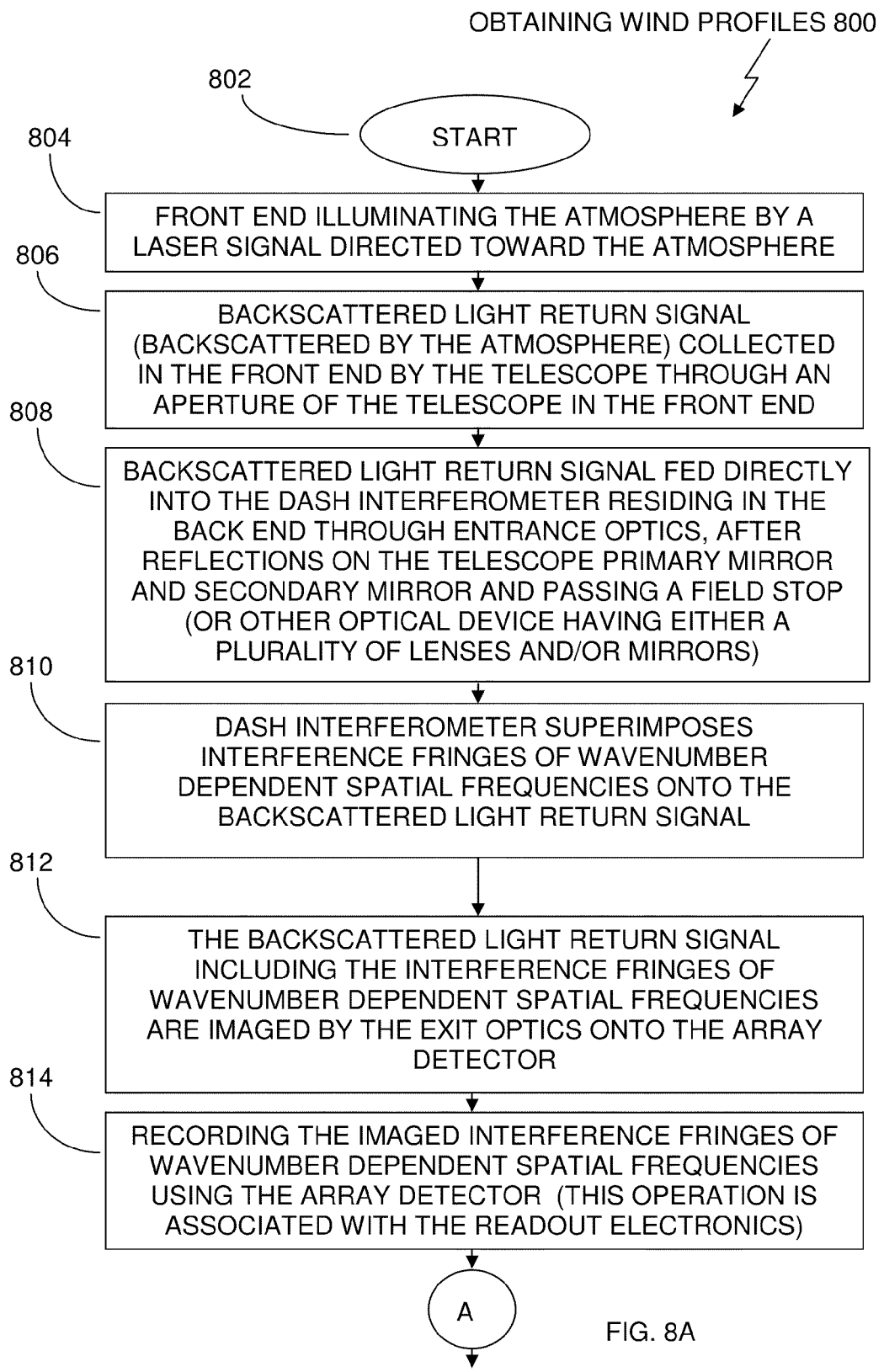
FIG. 8A and FIG. 8B illustrate a DASH LIDAR tropospheric wind measurement method and/or operation process flow chart.
Figure 9:
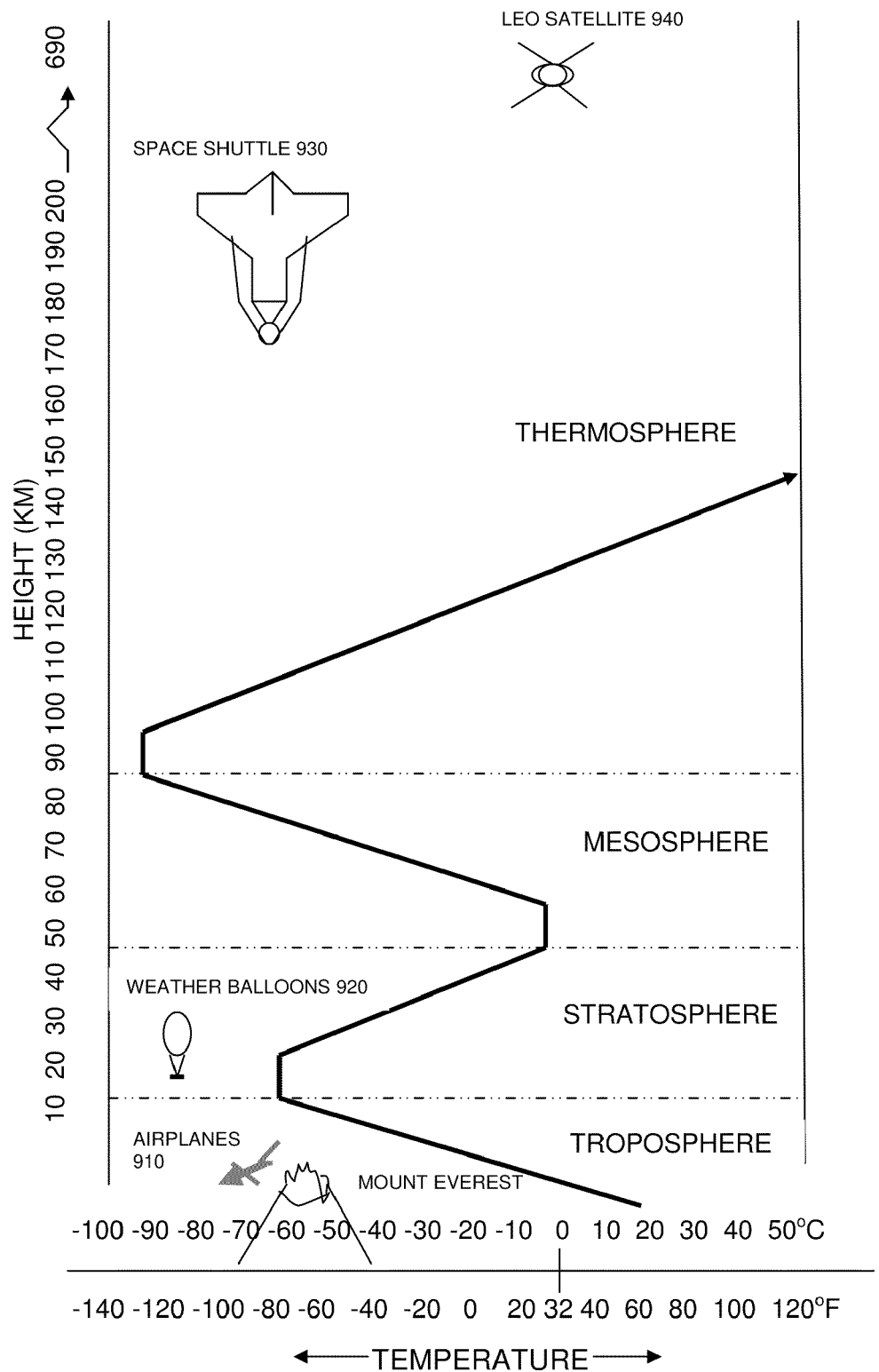
FIG. 9 illustrates a schematic of the Earth's atmosphere extending from the Earth's Troposphere to the Thermosphere.

In exemplary embodiments, referring again to FIG. 5 and FIG. 7, the back-end 120 includes the DASH 400 interferometer, a readout electronics 126 module and an instrument control and data management 122 module. The computer processor unit (such as the processor unit 590) resides in the instrument control and data management 122 module. A program unit residing in the processor unit 590 includes an algorithm unit containing deterministic algorithms used in association with readout electronics 126, as well as the instrument control and data management 122. The computer processor unit (such as the processor unit 590) includes a computer processor executing computer readable and computer executable program code (such as program 1010 code), that when executed by the computer processor causes the computer processor, in cooperation with the Doppler wind LIDAR 700 to perform a method of obtaining (via either space borne, airborne and/or ground station platforms (i.e., where the ground station platforms can be either stationary and/or mobile ground station platforms)), atmospheric wind observations for obtaining atmospheric wind profiles, including global, as well as non-global tropospheric vertical wind profiles, using the DASH 400 interferometer as a direct detection system of the Doppler wind LIDAR 700 instrument, based on program 1010 code logic instructions causing the following operations:

Referring to FIG. 8A, at the operation "start" 802, the Doppler wind LIDAR 700 receives a signal from an operator, user and/or controlling device, such as the processor unit 590 which activates and initiates the program 1010 for the method 800. Once activated, the program 1010 code interacts with other programs, such as algorithms having instructions and other programs to exercise and perform operations in cooperation with the Doppler wind LIDAR 700 and its platform environment(s) to obtain wind profiles, such as the following operations and/or sub-operations:

Referring to FIG. 7, FIG. 8A and FIG. 9, at operation 804, the computer processor executing the program 1010 code cooperates with the Doppler wind LIDAR 700 instrument by illuminating the atmosphere 102 using the laser beam signal 104 emitted in a direction towards the atmosphere 102 from the front-end of the Doppler wind LIDAR 700 instrument. The Doppler wind LIDAR 700 resides in either a space borne platform such as a satellite orbiting the Earth in a Low Earth Orbit (LEO) (see the LEO satellite 940 illustrated in FIG. 9) or a space craft such as the space shuttle 930 or resides in an airborne platform, such as either airplanes 910 or weather balloons 920 (see FIG. 9) or resides in a ground station platform. Furthermore, the computer processor executing the program 1010 code in the back-end causes recording of timing of the laser beam signal 104 pulse, where at any given time the pulse illuminates the atmosphere 102, that time is recorded and can be made available to be read out by the readout electronics module 126 residing in the back-end of the Doppler wing LIDAR 700 instrument.

Referring to FIG. 7 and FIG. 8A, at operation 806, the computer processor executing the program 1010 code cooperates with the Doppler wind LIDAR 700 instrument by collecting, via the telescope 114, a backscattered laser light return signal(s) 130, backscattered by the atmosphere 102, after the atmosphere 102 is illuminated by the laser 112. The backscattered laser light return signal(s) 130 are collected through an aperture of the telescope 114.

Referring to FIG. 4, FIG. 5, FIG. 7 and FIG. 8A, at operation 808, the computer processor executing the program code cooperates with the Doppler wind LIDAR 700 instrument by feeding the backscattered light return signal(s) 130 directly into the DASH 400 interferometer (where the DASH 400 is residing in the back-end of the Doppler wind LIDAR 700 instrument) through an aperture 450 and through entrance optics 481 (see FIG. 4 and FIG. 5), after reflections of the backscattered laser light return signal(s) 130 occur on the primary mirror 514P (TPM) and the secondary mirror 514S (TSM) of the telescope 114.

Referring to FIG. 3, FIG. 5, FIG. 7, FIG. 8A and FIG. 10, at operation 810, the computer processor executing the program 1010 code cooperates with the Doppler wind LIDAR 700 instrument by superimposing, by the DASH 400 interferometer, a plurality of interference fringes of wavenumber dependent spatial frequencies onto the backscattered laser light return signal(s) 130.

Referring to FIG. 3, FIG. 4, FIG. 5, FIG. 7 and FIG. 8A, at operation 812, the computer processor executing the program code cooperates with the Doppler wind LIDAR 700 instrument by imaging, on the array detector 410 by exit optics 482 (L2) and exit optics 483 (L3), the backscattered laser light return signal(s) 130, including the plurality of interference fringes of wavenumber dependent spatial frequencies superimposed onto the backscattered light return signal(s) 130.

Referring to FIG. 3, FIG. 4, FIG. 5, FIG. 7 and FIG. 8A, at operation 814, the computer processor executing the program 1010 code cooperates with instrument control and data management 122 of the Doppler wind LIDAR 700 instrument, in the recording, by the array detector 410, of the plurality of interference fringes of wavenumber dependent spatial frequencies imaged on the array detector 410, as well as, in the recording of the difference (such as recording a delay time) between the laser pulse (such as the laser beam signal 104) illuminating the atmosphere 102 and in the recording of the backscattered laser light return signal(s) 130 and in the outputting of a corresponding interference image pattern by the readout electronics 126 module. The operations performed by the method 800 as illustrated in FIG. 8A are continued as indicated by the continuation element "A" illustrated at the bottom of FIG. 8A and through the continuation element "A" illustrated at the top of FIG. 8B.

Referring to FIG. 1B, FIG. 2, FIG. 3, FIG. 4, FIG. 5, FIG. 7 and FIG. 8B, at operation 816, the computer processor executing the program 1010 code cooperates with the Doppler wind LIDAR 700 instrument in determining as a function of the delay time, by the computer processor unit (such as the processor unit 590), executing the computer executable program code (such as program 1010 code), a Doppler shift 200 of the backscattered light return signal(s) 130, with and/or having superimposed interference fringes of wavenumber dependent spatial frequencies superimposed onto the backscattered light return signal(s) 130 and/or optionally determining simultaneous calibration information from a simultaneously recorded calibration source signal. Determining includes measuring a plurality of phase points of a heterodyned interferogram over a large path difference interval simultaneously, using a plurality of stationary optical components, where the large path difference interval includes a path difference interval of typically several centimeters. Additionally in exemplary embodiments, the plurality of phase points includes a range of phase points from more than four phase points up to about 512 phase points, containing enough information to determine a Doppler shift 200 caused by atmospheric winds. Measuring the plurality of phase points of the heterodyned interferogram over the large path difference interval simultaneously, provides increased immunity to background signals, increased immunity to laser mode hopping effects, and increased immunity to interferometer ghosts. Additionally, measuring the plurality of phase points of the heterodyned interferogram over the large path difference interval includes simultaneously measuring a plurality of interferogram fringe samples. The plurality of interferogram fringe samples ranges from about 40 interferogram fringe samples to about 200 interferogram fringe samples and allows the simultaneous phase tracking of additional calibration lines.

Figure 8B:
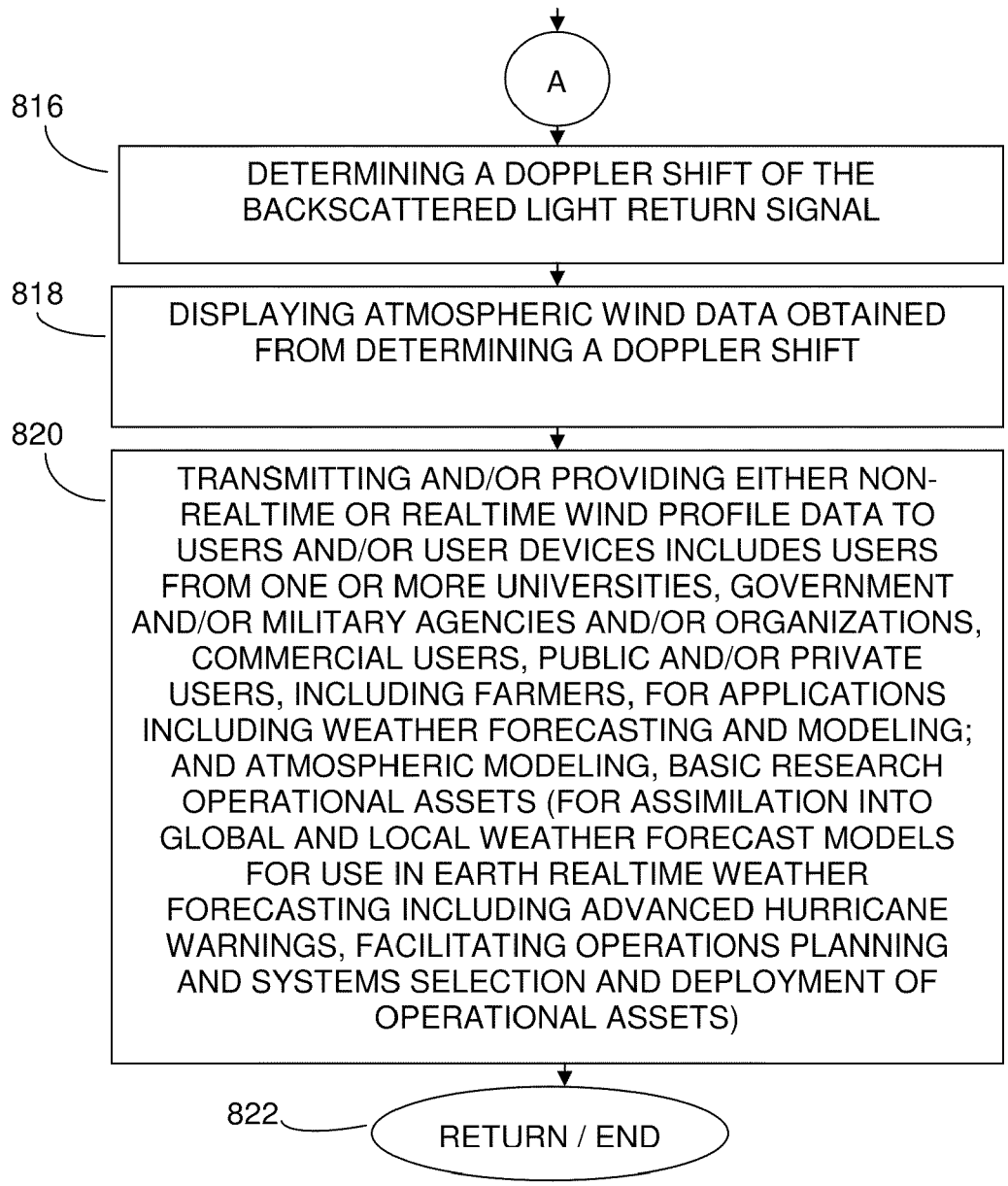

Referring to FIG. 7 and FIG. 8B, at operation 818, the computer processor executing the program 1010 code cooperates with the readout electronics 126 module of the Doppler wind LIDAR 700 instrument by displaying on an output device, atmospheric wind data obtained from determining a Doppler shift 200.

Referring to FIG. 1B, FIG. 2, FIG. 3, FIG. 4, FIG. 5, FIG. 7, FIG. 8B, and FIG. 10 at operation 820, the computer processor executing the program 1010 code cooperates with the Doppler wind LIDAR 700 instrument by transmitting electronically and either providing and/or displaying, over a communications network, either a plurality of real-time and/ or a plurality of non-real-time, atmospheric wind profiles and atmospheric wind data obtained from determining the Doppler shift 200, by the computer processor unit (such as the processor unit 590), from the backscattered laser light return signal(s) 130 having the superimposed interference fringes of wavenumber dependent spatial frequencies, to a plurality of users and/or a plurality of user devices. The plurality of users includes users from one or more universities, government agencies, military organizations, commercial organizations, public organizations, individual users including farmers, pilots, sailors, and navigators, where the plurality of real-time wind profiles and atmospheric wind data are assimilated into a plurality of applications including global and local real-time and non-real-time weather forecasting and global and local real-time and non-real-time atmospheric modeling, weather avoidance navigation, basic research, advanced hurricane warnings, operations planning, systems selections and deployment of operational assets. These atmospheric wind profiles are either tropospheric wind profiles or stratospheric wind profiles, and the tropospheric wind profiles are tropospheric vertical wind profiles.

Referring to FIG. 8B, at an operation "return/end" 822 (hereafter "the operation return/end 822"), the one or more programs executed by the one or more processors in the processor unit 590 causes the method 800 to return to any of the above operations, such as the operation 804 through operation 820 of the method 800 to continue iteratively processing and causing the Doppler wind LIDAR 700 to perform the operations of the method 800 of obtaining wind profile data and/or the program causes the method 800 to end.

The foregoing description of the specific embodiments will so fully reveal the general nature of the invention that others can, by applying knowledge within the ordinary skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments claimed herein, based on the teaching, guidance and claims presented herein.

What is claimed is:

1. A method of obtaining atmospheric wind profiles, using a Doppler Asymmetric Spatial Heterodyne Spectroscopy (i.e., a DASH) interferometer as a direct detection system of a Doppler wind Light Detection and Ranging (i.e., a LIDAR) instrument, wherein the LIDAR instrument includes a front end and a back end, wherein the front end includes a laser and a telescope, wherein said back end includes said DASH interferometer, a readout electronics module and an instrument control and data management module, wherein the instrument control and data management module includes a computer processor executing a computer executable program code, that when executed by the computer processor performs the method comprising:

in the front end of the LIDAR instrument residing in one of a space borne platform, an airborne platform and a ground station platform, illuminating an atmosphere using a laser signal directed towards the atmosphere, wherein the laser signal directed towards the atmosphere is emitted by the laser residing in the front end of the LIDAR instrument;

collecting, by the telescope, a backscattered light return signal, backscattered by the atmosphere, after the atmosphere is illuminated by the laser;

feeding the backscattered light return signal directly into said DASH interferometer, residing in said back end of the LIDAR instrument, through entrance optics, after reflections of the backscattered light return signal on a primary mirror and a secondary mirror of the telescope;

superimposing, by said DASH interferometer, a plurality of interference fringes of wavenumber dependent spatial frequencies onto the backscattered light return signal;

imaging, on an array detector by exit optics, the backscattered light return signal including the plurality of interference fringes of wavenumber dependent spatial frequencies superimposed onto the backscattered light return signal;

recording, by the array detector, the plurality of interference fringes of wavenumber dependent spatial frequencies imaged on the array detector, and recording the time difference such as a delay time between the laser beam signal pulse illuminating the atmosphere and the recording of the backscattered light return signal, and outputting a corresponding interference image pattern by the readout electronics module;

determining, by the computer processor executing the computer executable program code, one of a Doppler shift of the backscattered light return signal with the plurality of interference fringes of wavenumber dependent spatial frequencies superimposed, and simultaneous calibration information from a simultaneously recorded calibration source signal, as a function of the delay time, and;

transmitting electronically, and one of providing and displaying, over a communications network, one of a plurality of realtime and a plurality of non-realtime, atmospheric wind profiles and atmospheric wind data obtained from determining the Doppler shift of the backscattered light return signal having superimposed interference fringes of wavenumber dependent spatial frequencies to one of a plurality of users and a plurality of user devices.

2. The method according to claim 1, wherein the space borne platform is a satellite orbiting Earth in a low Earth orbit, wherein the airborne platform is one of an airplane and a balloon, and wherein the ground station platform is one of a stationary ground station and a mobile ground station.

3. The method according to claim 1, wherein feeding includes feeding the backscattered light return signal from the telescope through an aperture of said DASH interferometer.

4. The method according to claim 3, wherein feeding includes feeding the backscattered light return signal directly into said DASH interferometer, through entrance optics of other optical devices having one of a plurality of lenses and a plurality of mirrors, upon feeding the backscattered light return signal through the aperture of said DASH interferometer.

5. The method according to claim 1, wherein determining includes measuring, a plurality of phase points of a heterodyned interferogram over a large path difference interval simultaneously, using a plurality of stationary optical components wherein the large path difference interval includes a path difference interval of typically several centimeters.

6. The method according to claim 5, wherein the plurality of phase points includes a range of phase points from more than four phase points up to about 512 phase points, containing enough information to determine a Doppler shift caused by atmospheric winds.

7. The method according to claim 5, wherein measuring, the plurality of phase points of the heterodyned interferogram over the large path difference interval simultaneously, provides increased immunity to background signals, increased immunity to laser mode hopping effects, and increased immunity to interferometer ghosts.

8. The method according to claim 5, wherein measuring the plurality of phase points of the heterodyned interferogram over the large path difference interval includes simultaneously measuring a plurality of interferogram fringe samples.

9. The method according to claim 8, wherein the plurality of interferogram fringe samples ranges from about 40 interferogram fringe samples to about 200 interferogram fringe samples and causes a simultaneous phase tracking of additional calibration lines.

10. The method according to claim 5, wherein the plurality of users includes users from one or more universities, government agencies, military organizations, commercial organizations, public organizations, individual users including farmers, pilots, sailors, and navigators, wherein the plurality of realtime wind profiles and atmospheric wind data are assimilated into a plurality of applications including global and local realtime and non-realtime weather forecasting and global and local realtime and non-realtime atmospheric modeling, weather avoidance navigation, basic research, advanced hurricane warnings, operations planning, systems selections and deployment of operational assets, and wherein atmospheric wind profiles are one of tropospheric wind profiles and stratospheric wind profiles, and wherein tropospheric wind profiles are tropospheric vertical wind profiles.

11. A system monitoring an atmospheric environment and obtaining atmospheric wind profiles facilitating weather forecasting, weather modeling, weather avoidance navigation, atmospheric research, hurricane warnings and operations systems selections and deployment of operational assets, the system comprising:
  a Doppler wind light detection and ranging (a LIDAR) instrument, having a front end and a back end;
  a laser, cooperatively coupled to the LIDAR instrument, causing a laser signal to be emitted into the atmosphere, wherein the laser resides in the front end of the LIDAR instrument;
  a telescope, cooperatively coupled to the LIDAR instrument, wherein the telescope resides in the front end of the LIDAR instrument and collects a backscattered light return signal;
  a Doppler asymmetric spatial heterodyne spectroscopy (a DASH) interferometer, residing in said back end of the LIDAR instrument, operating as a direct detection apparatus, cooperatively coupled to the telescope, wherein said DASH interferometer includes:
    an exit optics module,
    an entrance optics module cooperatively coupled to the telescope, and
    an array detector, cooperatively coupled to the exit optics module;
  a readout electronics module, residing in said back end of the LIDAR instrument, cooperatively coupled to the array detector; and
  an instrument control and data management module, residing in said back end of the LIDAR instrument, cooperatively coupled to at least the laser and the readout electronics module, wherein the instrument control and data management module includes a computer processor executing a computer executable program code, that when executed by the computer processor performs the operations comprising:
    illuminating an atmosphere using the laser signal emitted into the atmosphere, wherein the laser signal emitted into the atmosphere is emitted by the laser residing in the front end of the LIDAR instrument,
    collecting, by the telescope, in the front end of the LIDAR instrument, the backscattered light return signal, backscattered by the atmosphere, after the atmosphere is illuminated by the laser,
    feeding includes one of feeding the backscattered light return signal directly into said DASH interferometer, residing in said back end of the LIDAR instrument, through entrance optics, after reflections of the backscattered light return signal on a primary mirror and a secondary mirror of the telescope, and feeding the backscattered light return signal directly into said DASH interferometer, through an aperture and entrance optics of other optical devices having one of a plurality of lenses and a plurality of mirrors,
    superimposing, by said DASH interferometer, a plurality of interference fringes of wavenumber dependent spatial frequencies onto the backscattered light return signal,
    imaging, on the array detector by exit optics, the backscattered light return signal including the plurality of interference fringes of wavenumber dependent spatial frequencies superimposed onto the backscattered light return signal,
    recording, by the array detector, the plurality of interference fringes of wavenumber dependent spatial frequencies imaged on the array detector, and outputting a corresponding interference image pattern by the readout electronics module,
    determining, by the computer processor executing the computer executable program code, a Doppler shift of the backscattered light return signal, and,
    transmitting and one of providing and displaying, over a communications network, one of a plurality of realtime and a plurality of non-realtime, atmospheric wind profiles and atmospheric wind data, obtained from determining the Doppler shift of the backscattered light return signal, to one of a plurality of users and a plurality of user devices.

12. The system according to claim 11, wherein the LIDAR instrument resides in one of a space borne platform, an airborne platform and a ground station platform, and wherein the space borne platform is a satellite orbiting Earth in a low Earth orbit, wherein the airborne platform is one of an airplane and a balloon, and wherein the ground station platform is one of a stationary ground station and a mobile ground station.

13. The system according to claim 11, wherein determining includes measuring, a plurality of phase points of a heterodyned interferogram over a large path difference interval simultaneously, using a plurality of stationary optical components wherein the large path difference interval includes a path difference interval of typically several centimeters.

14. The system according to claim 13, wherein the plurality of phase points includes a range of phase points from more than four phase points up to about 512 phase points, containing enough information to determine a Doppler shift caused by atmospheric winds.

15. The system according to claim 13, wherein measuring, the plurality of phase points of the heterodyned interferogram over the large path difference interval simultaneously, provides increased immunity to background signals, increased immunity to laser mode hopping effects, and increased immunity to interferometer ghosts.

16. The system according to claim 13, wherein measuring the plurality of phase points of the heterodyned interferogram over the large path difference interval includes simultaneously measuring a plurality of interferogram fringe samples.

17. The system according to claim 16, wherein the plurality of interferogram fringe samples ranges from about 40 interferogram fringe samples to about 200 interferogram fringe samples and allows a simultaneous phase tracking of additional calibration lines.

18. The system according to claim 13, wherein the plurality of users includes users from one or more universities, government agencies, military organizations, commercial organizations, public organizations, individual users including farmers, pilots, sailors, and navigators, wherein the plurality of realtime wind profiles and atmospheric wind data are assimilated into a plurality of applications including global and local realtime and non-realtime weather forecasting and global and local realtime and non-realtime atmospheric modeling, weather avoidance navigation, basic research, advanced hurricane warnings, operations planning, systems selections and deployment of operational assets, and wherein atmospheric wind profiles are one of tropospheric wind profiles and stratospheric wind profiles, and wherein tropospheric wind profiles are tropospheric vertical wind profiles.

19. A non-transitory computer readable medium and a non-transitory computer executable medium having a plurality of computer executable instructions, residing and operating in an instrument control and data management module having a plurality of computer processors, executed by the plurality of computer processors causing the plurality of computer processors to perform a method of obtaining atmospheric wind profiles, using a Doppler Asymmetric Spatial Heterodyne Spectroscopy (a DASH) interferometer as a direct detection system in a Doppler wind Light Detection and Ranging (a LIDAR), wherein the LIDAR instrument includes a front end and a back end, wherein the front end includes a laser and a telescope, wherein the back end includes said DASH interferometer and the instrument control and data management module, wherein the non-transitory computer readable medium and the non-transitory computer executable medium comprising the plurality of computer executable instructions includes:

instructions causing illuminating, by the LIDAR instrument residing in one of a space borne platform, an airborne platform and a ground station platform, an atmosphere, using a laser signal directed towards the atmosphere, wherein the laser signal directed towards the atmosphere is emitted by the laser residing in the front end of the LIDAR instrument, and wherein timing of the laser signal illuminating the atmosphere is recorded in the back end;

instructions involving collecting, by the telescope, a backscattered light return signal, backscattered by the atmosphere, after the atmosphere is illuminated by the laser;

instructions causing feeding the backscattered light return signal directly into said DASH interferometer, residing in said back end of the LIDAR instrument, through entrance optics, after reflections of the backscattered light return signal on a primary mirror and a secondary mirror of the telescope;

instructions causing superimposing, by said DASH interferometer, a plurality of interference fringes of wavenumber dependent spatial frequencies onto the backscattered light return signal;

instructions causing imaging, on an array detector by exit optics, the backscattered light return signal including the plurality of interference fringes of wavenumber dependent spatial frequencies superimposed onto the backscattered light return signal;

instructions causing recording, by the array detector, the plurality of interference fringes of wavenumber dependent spatial frequencies imaged on the array detector, and outputting a corresponding interference image pattern by a readout electronics module;

instructions causing determining a Doppler shift of the backscattered light return signal, by an at least one computer processor of the plurality of computer processors executing a computer executable program code, wherein the non-transitory computer readable medium and non-transitory computer executable medium residing in the instrument control and data management module includes non-transitory computer readable data storage media including storage devices, such as disc drives, and;

instructions causing transmitting electronically, and one of providing and displaying, over a communications network, one of a plurality of realtime and a plurality of non-realtime, atmospheric wind profiles and atmospheric wind data obtained from determining the Doppler shift of the backscattered light return signal to one of a plurality of users and a plurality of user devices.

20. The non-transitory computer readable medium according to claim 19, wherein instructions causing determining include instructions causing measuring, a plurality of phase points of a heterodyned interferogram over a large path difference interval simultaneously, using a plurality of stationary optical components, wherein the large path difference interval includes a path difference interval of typically several centimeters, wherein the plurality of phase points includes a range of phase points from more than four phase points up to about 512 phase points, containing enough information to determine a Doppler shift caused by atmospheric winds, wherein measuring the plurality of phase points of the heterodyned interferogram over the large path difference interval includes simultaneously measuring a plurality of interferogram fringe samples, wherein the plurality of interferogram fringe samples ranges from about 40 interferogram fringe samples to about 200 interferogram fringe samples and allows a simultaneous phase tracking of additional calibration lines, for assimilation into a plurality of applications including global and local realtime and non-realtime weather forecasting and global and local realtime and non-realtime atmospheric modeling, weather avoidance navigation, basic research, advanced hurricane warnings, operations planning, systems selections and deployment of operational assets, and wherein atmospheric wind profiles are one of tropospheric vertical wind profiles and stratospheric wind profiles.

* * * * *